B. C. COONS.
APPARATUS FOR FEEDING APPLES.
APPLICATION FILED MAR. 19, 1908.
1,070,416.
Patented Aug. 19, 1913.
3 SHEETS—SHEET 3.
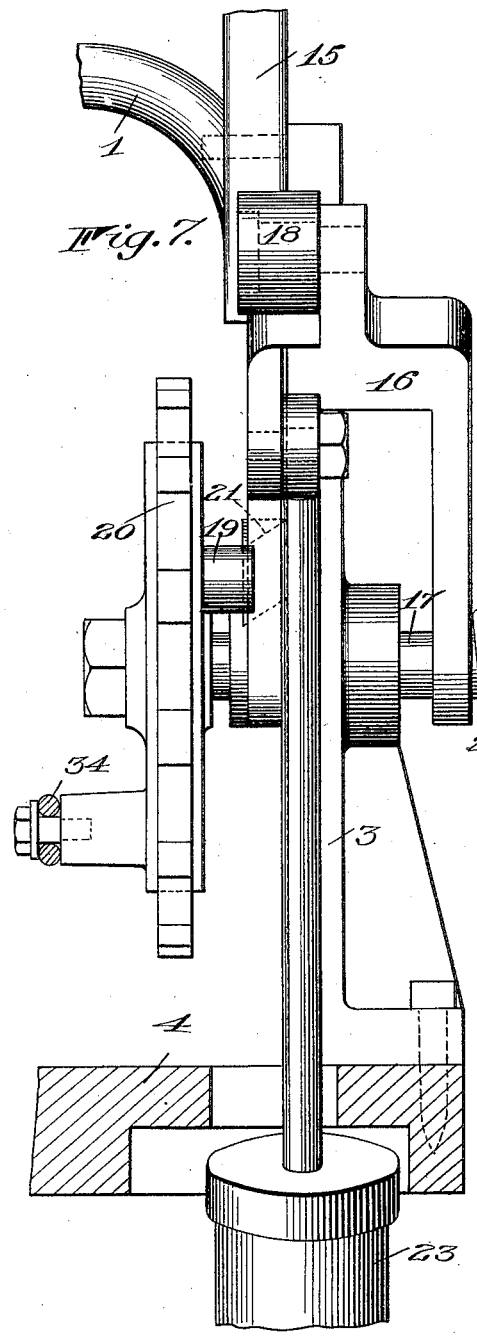
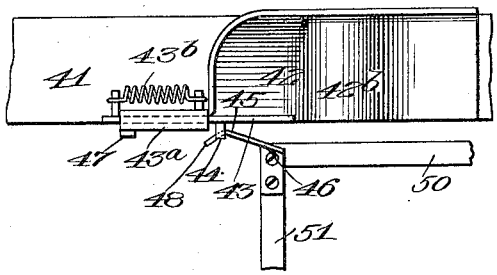
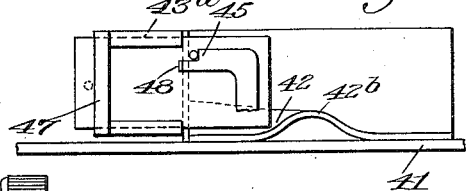
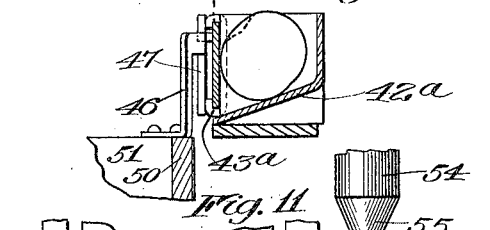
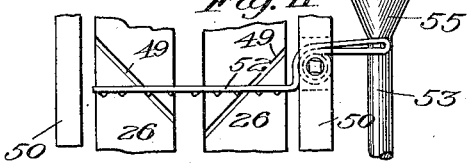
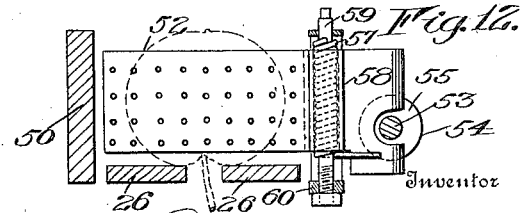

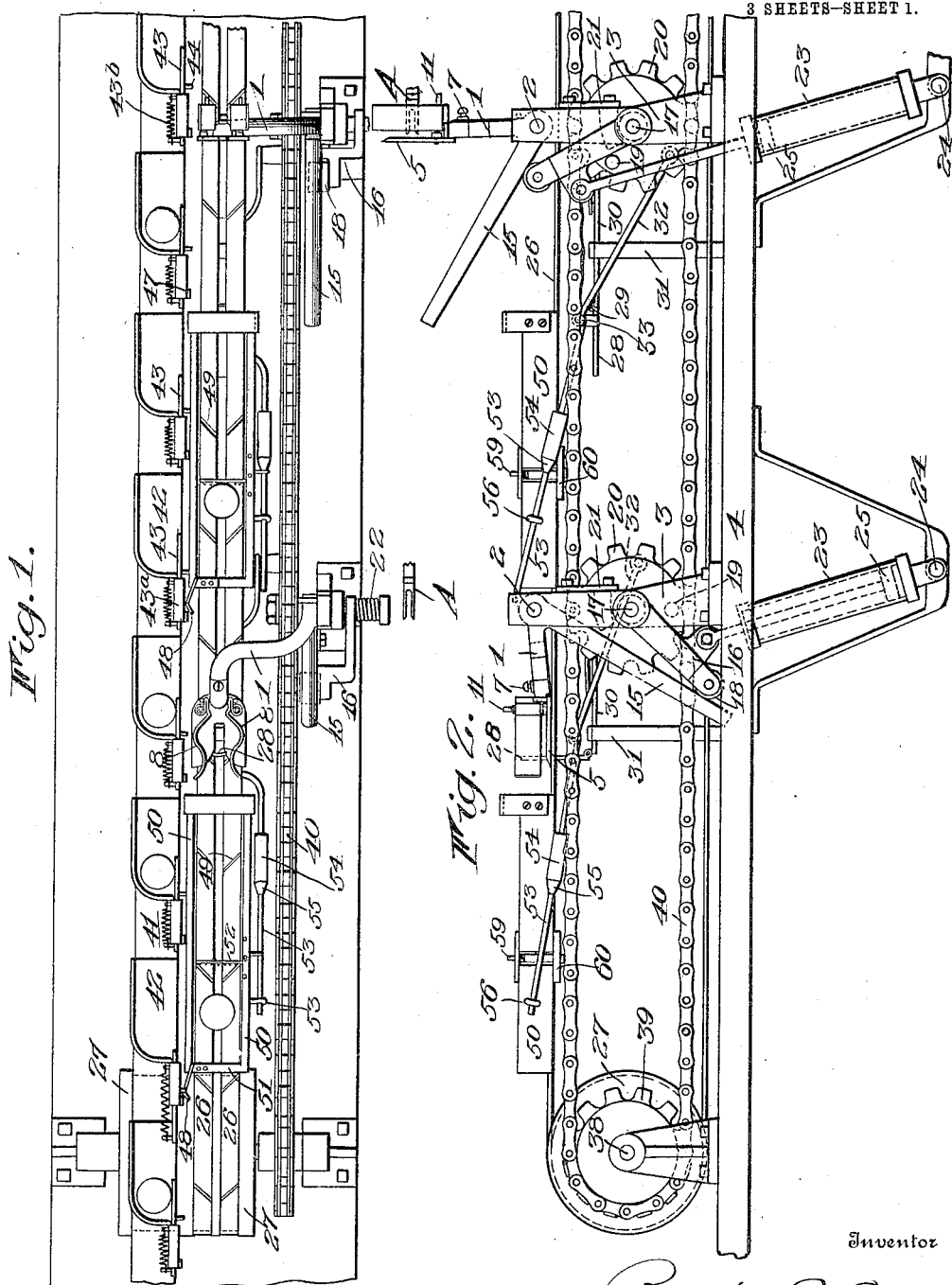

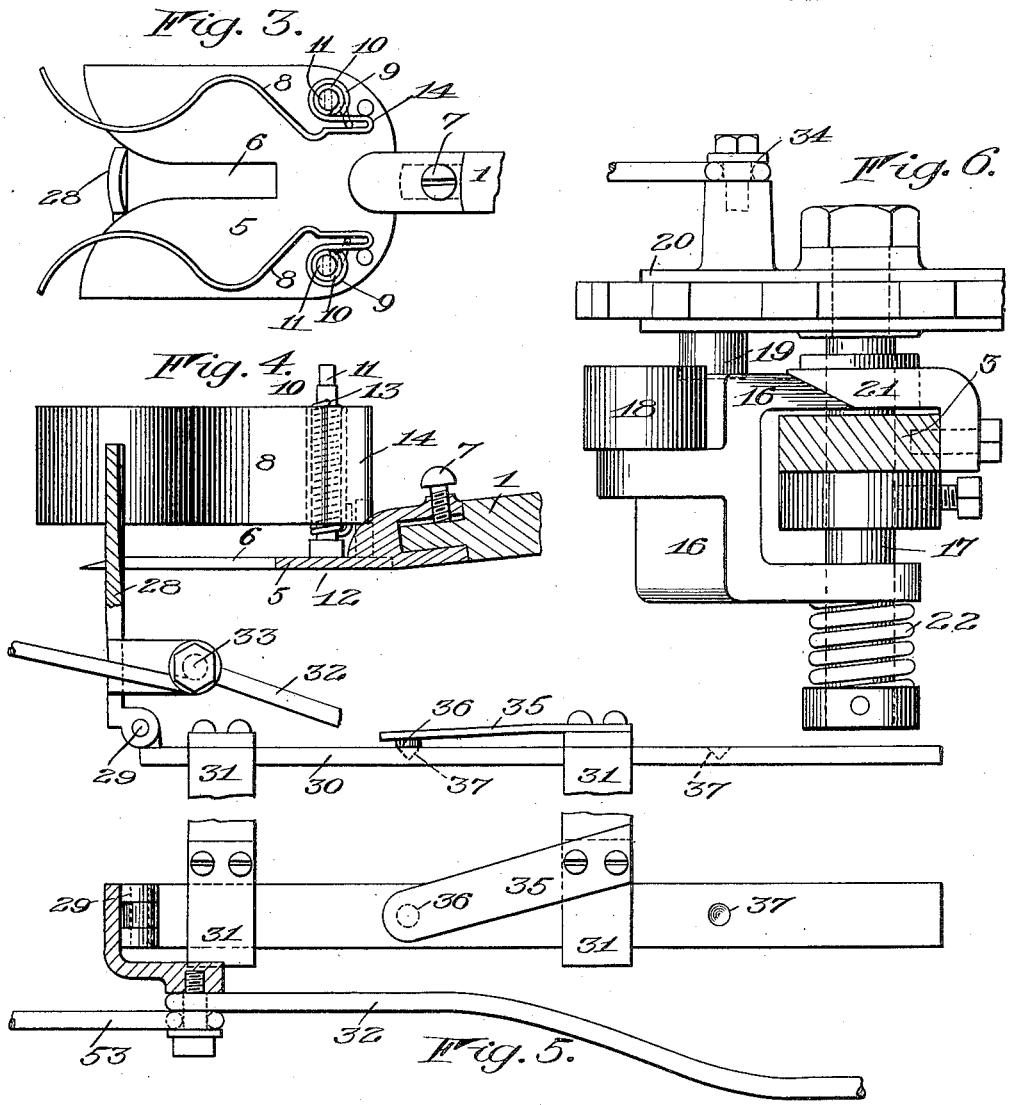

UNITED STATES PATENT OFFICE.

BURTON CRAIG COONS, OF ROCHESTER, NEW YORK.

APPARATUS FOR FEEDING APPLES.

1,070,416.  Specification of Letters Patent.  Patented Aug. 19, 1913.

Application filed March 19, 1908. Serial No. 422,156.

*To all whom it may concern:*

Be it known that I, BURTON C. COONS, of Rochester, in the county of Monroe and State of New York, have invented certain new and useful Improvements in Apparatus for Feeding Apples; and I do hereby declare the following to be a full, clear, and exact description of the same, reference being had to the accompanying drawings, forming a part of this specification, and to the reference-numerals marked thereon.

The present invention relates to apparatus for feeding apples or the like to paring or cutting machines and it has for an object to provide a machine which will do away with hand feeding and insure the proper centering of the apple on the fork or other device which supports the apple during the paring or slicing.
To this and other ends the invention consists in certain improvements and combinations of parts all as will be hereinafter more fully described, the novel features being pointed out in the claims at the end of the specification.

In the drawings: Figure 1 is a plan view of a portion of an apparatus constructed in accordance with this invention; Fig. 2 is a side view of the same parts; Fig. 3 is a detail view of the carrier for presenting the apples to the paring or the slicing machine; Fig. 4 is a detail view partially in section and partially in elevation, showing the above mentioned carrier and the feeder therefor; Fig. 5 is a detail sectional view of the feeder showing parts of its operating mechanism in plan. Fig. 6 is a detail view of the mechanism for operating the carrier that presents the apples to the slicing or the paring machine. Fig. 7 is another detail view of the same mechanism showing the parts in elevation. Figs. 8 and 9 are a plan view and a side elevation respectively of one of the pockets that carries the apples from the bin, together with the operating device for the door of the pocket. Fig. 10 is a transverse sectional view of the pocket, the operating device being also shown, and Figs. 11 and 12 are a top view and a side view of a gate that retards the apples, surrounding and coöperating parts being also shown.

In the illustrated embodiment of my invention I employ a carrier which presents the apples to the fork A of a paring machine or to the receiving part of a paring or slicing machine. This carrier is preferably mounted to swing in the arc of a circle and for this purpose may be supported by a bent arm 1 which is journaled on a horizontal axis 2 on an upright bracket 3 that is carried by the main frame 4.

The carrier comprises preferably a flat support 5 normally lying in a horizontal position and having its free edge beveled and also recessed at 6 in order to receive the projecting stems of the apples so that the latter will lie perfectly flat thereon. It is detachably secured to the arm 1 by a screw 7 in order that others may be made to agree with the grade or size of the apples.

For centering the apples on the support so that the fork A will pass into the core of the apple, I employ centering devices comprising preferably a pair of relatively movable members or yielding jaws 8 curved and arranged on opposite sides of the recess 6, and having diverging free ends or faces providing a lateral entranceway which permits the introduction of the apples into the pocket between the jaws in a plane substantially parallel with the flat support. The other ends of the relatively movable members may be pivotally secured to the support to turn about axes perpendicular to the supporting face of the support so that said jaws may swing in a plane parallel with the supporting face of the support. In this embodiment, the jaws are formed into tubes or sleeves 9 which surround helical springs 10 that are fitted over posts 11, the posts being rotatable in the supports by screw connections 12, and having the springs 10 secured thereto at 13. The screw connections 12 are the same as those illustrated at 60, Fig. 12. The other ends of the springs are secured to the jaws to move them toward each other, being arranged between the arms of loops 14 which add resiliency to the jaws.

The construction of the carrier herein shown permits the apples to enter between the movable jaws 8 in the plane substantially parallel with the flat support 5 so that one of the ends of the apples will lie against the support to prevent their tilting when the supporting device or fork of the paring machine engages them and removes them in a plane perpendicular to the support.

The oscillation or movement of the carrier is effected preferably by means of a suitable mechanism which coöperates with an arm 15 extending from the arm 1 of the carrier. This mechanism comprises in the present instance a swinging member 16 journaled on a shaft 17 arranged on bracket 3 below the axis 2 of the carrier and having a roller 18 at its end bearing against one side of arm 15 to elevate the latter with the carrier when it is swung upwardly. The upward movement of the swinging member may be effected by a projection 19 on a rotary element or driver 20, which turns about an axis coincident with the turning axis of the swinging member, this projection engaging the arm after an apple has been fed to the carrier, and moving the arm until the carrier reaches the upward limit of its movement as shown at the right hand side of Fig. 2. At this point the swinging member is released, this being preferably effected by mounting the swinging member so that it may move in the direction of its axis on shaft 17 away from the projection 19. The movement away from the projection may be produced by a cam 21 carried by the bracket 3 to engage the swinging member. The plate, which carries the cam 21 may be adjusted on the bracket to vary the time of release of the carrier and for this purpose the plate is slotted in order that the bolts which secure it to the bracket 3 may work in the slot. A spring 22 surrounds the shaft 17 and bears against the swinging member to move it toward the projection. It will be noted that the projection 19 serves as a clutch interposed between the rotary element 20 and the swinging member and that the cam 21 acts as a device for operating the clutch when the carrier reaches a certain position.

As soon as the swinging member is released from the projection 19, it drops by gravity and its descent is checked by a brake in the form of a fluid cylinder 23 pivoted at 24 to the main frame 4 and having a piston 25 working therein and pivotally connected to the swinging member.

The apples are fed to the carrier preferably while the latter is arranged horizontally as shown at the left hand side of Fig. 2. This feeding is periodic and may be accomplished by means of a reciprocatory and oscillatory member 28 which moves to and from the line of travel of the apples and carries them to the carrier. In the present instance the carrier rests upon two spaced supports in the form of two endless conveyers or belts 26 which travel about two grooved pulleys 27 and carry the apples with their stem ends lowermost to the field of the reciprocatory and oscillatory feeder 28 which travels between the belts or supports and forces the apples one by one between the jaws. The feeder is preferably pivoted at 29 to a slide 30 which moves on guides 31. It is operated by a pitman 32 that is pivoted thereto at one end at 33 and is connected at 34 at its other end to the rotary element 20 before mentioned, so that the feeder makes one complete movement for every complete movement of the carrier. The connection of the pitman with the member 28 not only effects the swinging movement of the member, but it causes the slide to move, the swinging movement, however, taking place before the movement of the slide by reason of the employment of a retarding device acting on the slide. This retarding device may comprise a spring finger 35 having a nose 36 to enter either one of notches 37 arranged to receive the finger at both ends of the movement of the slide.

If desired, two or more carriers may be employed for the pair of belts 26, and in order to drive them from the same source, the shafts 38 on which the grooved pulleys 27 travel (only one pulley being shown) each carry a sprocket 39 about which passes a sprocket chain 40 that also passes about the rotary elements 20 which for this purpose are provided with teeth forming sprockets.

Suitable means for feeding apples to the belts in advance of each carrier is employed and may consist of an endless carrier 41 leading from an apple bin over grooved pulleys 27 having a plurality of pockets 42 thereon. Theses pockets each have an open side with an inclined bottom 42$^a$ for causing the apples to roll from the pockets to the belts 26. The front wall of the pocket is also open, and a curved ridge 42$^b$ is formed in the bottom to prevent more than one apple being retained in the pocket. The open side of a pocket is closed by a sliding door 43 movable on guides 43$^a$ and normally pressed to closed position by a spring 43$^b$. In order that the doors may be moved to feed both carriers, they are provided with projections 44 and these projections are arranged at different elevations so that stops 45 also arranged at different elevations will engage them as the pockets 42 pass the stops, thus opening the doors. Of course, the first stop will only open those doors where the projections 44 are arranged at a corresponding elevation, while the second stop will only open those doors having projections arranged at its elevation. The stops 45 are carried by spring fingers 46 so that they may be moved out of the path of the projection after the door has been opened, the movement of the finger being effected by bars or abutments 47 on the pockets engaging deflected portions 48 on the fingers.

As the apples drop onto the belts 26 they bounce and finally come to rest on their top or stem ends with the stem lying between the belts. In order to insure that the stem will be between the belts I provide diverging corrugations or ribs 49 on the belts to draw the stems to this position.

A suitable hopper open at its forward end and closed on its sides by side pieces 50 and at its near end by an end piece 51, prevents the apples from leaving the belt until they reach the carrier, the reciprocatory and oscillatory feeder 28 being arranged to work through the open end of the hopper.

Of course, the apples fall on the belt in different positions, some in advance of the others, and in order to properly time them to the feeder 28, and at the same time to right them on the conveyer or supporting surface in order to cause them to assume positions with their cores upright, I employ a retarding device which is preferably in the form of a gate 52 mounted to swing forwardly and preferably controlled by the feeder 28. This control is effected by a reciprocatory rod or bar 53 which has a cam 54 thereon in the form of an enlargement having a beveled end 55 engaging an extension on the gate 52, the bar being slidably mounted at 56 on one of the side pieces 50 and pivotally connected to the member 28 at its other end. The cam only moves the gate 52 in one direction, that is to open position, and it is moved in the other direction by a coil spring 57 which like the springs of the jaws 8 are protected from the apple juice by being housed in a tube 58. The spring is adjusted by a rotary post 59 that has screw threaded connection with a rigidly supported nut 60.

Owing to the fact that the belts 26 are moving while the gate 52 retards the apples, the apples will turn over unless some means is provided to prevent this action. I prevent this by roughening the rear face of the gate so as to provide greater friction thereon than on the belt, thus permitting the apples to slide on the belt without turning.

The operation of the invention will be understood from the foregoing description, but to recapitulate: The apparatus may be adapted to feed automatically one or more machines from a single bin. The endless belt or carrier 41 leads from the bin and its pockets automatically discharge into the hoppers 50. After being held by the gates 52 until they are properly turned to the feeders 28, the apples are carried forwardly by belts or carriers 26 and are engaged by the feeders which force them between the jaws 8, where they are properly centered. The carriers now present them to the slicing or the paring machines.

I believe myself to be the first to provide a machine which will position apples in such a manner that the apples will be presented to the supporting device of a paring machine with the cores thereof alined with the axis of the supporting device. In the present embodiment I have accomplished this result by retarding the apples on the movable conveyer until they come to rest on one of their ends. I am aware, however, that other arrangements may be provided for this purpose and therefore desire to claim this idea in its broadest aspect.

A machine constructed in accordance with this invention is inexpensive to manufacture, and as it can be constructed to supply any number of machines it will dispense with the help at each machine usually required to feed it. In this manner it reduces the cost of slicing and paring apples. Further, it is more sanitary, as the apples do not have to be handled.

The construction of the carrier which presents the apple to the fork or supporting device of the paring machine is very important. It provides a flat surface on which the apple is held by spring jaws, these jaws acting to center the apple and at the same time coöperating with the flat support to cause the apple to rest on the support on one of its flattened ends. The jaws are so formed that they permit the entrance of the apple in a line parallel with the flat support and its discharge in a line perpendicular to the flat support, thus providing a construction which is especially adapted for feeding thereto mechanically. The machine also provides for the righting of the apple mechanically before it is presented to the carrier jaws.

While the invention is particularly designed for handling apples, it is apparent that it could be employed for handling other articles.

I claim as my invention:

1. An apple carrier comprising a flat support, and relatively movable members for centering apples on the support having provision permitting the introduction of the apples in a plane substantially parallel with the flat support and also having provision permitting the removal in a plane perpendicular to the said support.

2. An apple carrier comprising a flat support, and a pair of jaws movable relatively to the support and having diverging portions at one side of the support permitting the introduction of an apple in a plane parallel with the support.

3. The combination with an apple paring machine having a device for supporting an apple during the paring thereof, of a carrier for presenting an apple to said supporting device comprising a flat support, and devices for centering apples on the support having provision permitting the introduction of the apples in a plane substantially parallel with the support and also having provision permitting the removal in a plane perpendicular to said support.

4. An apple carrier comprising a support for an apple, and a pair of relatively movable jaws for centering an apple on the support, having portions in proximity to the support movable toward and from each other substantially in a plane parallel with the supporting surface of the support, to permit an apple to enter between them in a plane parallel with said supporting surface.

5. An apple carrier comprising a support for an apple and a pair of jaws for centering an apple on the support, said jaws being pivoted to swing substantially in a plane parallel with the supporting face of the support and having their opposed faces recessed to provide a pocket which on one side is closed by the support and on the opposite side is open to permit the removal of the apple, a lateral entranceway being provided to the pocket when the jaws swing away from each other.

6. An apple carrier comprising a support for an apple and a pair of jaws, each jaw being pivoted to turn about an axis perpendicular to the supporting face of the support, and the jaws having recesses to provide a pocket between them closed at one side by the support and open at its opposite side to permit the removal of the apple, the free or swinging ends of the jaws having diverging faces which permit an apple to enter the pocket in a plane parallel with the supporting face of the support.

7. The combination with an apple paring machine having a device for supporting an apple during the paring thereof, of a conveyer, a carrier having relatively movable members receiving the apples directly from the conveyer, and means for moving the carrier with its relatively movable members to deliver the apple properly centered to the supporting device of the paring machine.

8. The combination with an apple paring machine having a device for supporting an apple during the paring thereof, of a conveyer, a carrier receiving apples from the conveyer and presenting them properly centered to the supporting device, said carrier comprising a support and relatively movable jaws carried with the support, the support having its supporting face movable substantially into a plane with the supporting face of the conveyer to receive an apple between the jaws, and the jaws having portions in proximity to the support movable substantially in a plane parallel with the supporting face to provide a lateral entranceway between the jaws so that an apple may enter between them from the conveyer in a plane substantially parallel with the supporting face of the carrier support.

9. The combination with an apple paring machine having a device for supporting an apple during the paring thereof, of a carrier for delivering apples singly and properly centered to the supporting device embodying a flat support against which the apple rests, and relatively movable members movable with the support for centering the apple on the support.

10. The combination with an apple paring machine having a device for supporting an apple during the paring thereof, of a carrier for presenting apples singly and properly centered to the supporting device embodying a flat support and relatively movable members carried with the support and permitting the removal of the apple from the support in a line perpendicular to the plane thereof, and mechanism for feeding apples singly between the movable members of the carrier.

11. The combination with an apple paring machine embodying a device for supporting the apple during the paring thereof, of a carrier having relatively movable centering and holding members for delivering apples singly to the supporting device in properly centered position, and an endless conveyer for feeding apples to the centering and holding members of the carrier.

12. The combination with a plurality of apple paring machines each embodying a device for supporting the apples during the paring thereof, of a separate carrier having relatively movable and holding members for delivering apples singly to each supporting device, and a conveyer for feeding apples in an upright position to all of the carriers.

13. The combination with an endless conveyer on which apples are positioned in an upright position, of a carrier having relatively movable jaws for centering and holding an apple received from this conveyer, and a paring machine having a device for supporting an apple during the paring thereof to which apples are fed singly by the carrier.

14. The combination with an endless conveyer, of means for causing an apple to assume a position thereon with its core upright, a paring machine having a device for supporting an apple during the paring thereof, and means for feeding the uprighted apples to the supporting device properly centered on the latter.

15. The combination with a movable conveyer arranged to support apples, of a gate arranged to retard the apples thereon to cause them to come to rest on the conveyer on their ends.

16. The combination with a paring machine having a device for supporting an apple during the paring thereof, of a carrier for presenting the apples to the supporting device, and mechanism for delivering the apples to the carrier having means for causing the apples to rest on their ends.

17. The combination with a paring machine having a device for supporting an apple during the paring thereof, of mechanism for singly feeding apples to the supporting device having means for causing each apple to rest on one of its ends, and means for receiving the righted apple and centering the same for presentation to the supporting device.

18. The combination with a movable conveyer, of means for retarding apples thereon to cause them to come to rest on one of their ends, and a carrier movable to the plane of the conveyer and having centering jaws thereon.

19. The combination with a movable conveyer, of means for retarding apples thereon to cause the latter to come to rest on one of their ends, a carrier for presenting the apples to any suitable machine, having centering jaws, and a feeder moving the apples from the movable conveyer to the centering jaws.

20. The combination with a paring machine for supporting an apple during the paring thereof, of a movable conveyer, a carrier movable to the plane of the conveyer and embodying a support and centering jaws between which the apples are moved in a plane parallel with the support and from which they are removed by the supporting device of the paring machine in a plane perpendicular to the support, and means for retarding the apples on the conveyer to cause them to rest on one of their ends.

21. The combination with a paring machine for supporting an apple during the paring thereof, of a movable conveyer, a carrier movable to the plane of the conveyer and embodying a support and centering jaws between which the apples are moved in a plane parallel with the support and from which they are removed by the supporting device of the paring machine in a plane perpendicular to the support, means for retarding the apples on the conveyer to cause them to rest on one of their ends, and a pusher moving the apples from the conveyer to the carrier.

22. The combination with an apple paring machine having a device for supporting an apple during the paring thereof, of a conveyer, a carrier having relatively yielding centering jaws for delivering apples to the supporting device and movable toward and from the conveyer, and means for forcing apples into the jaws from the carrier.

23. The combination with an apple paring machine having a device for supporting apples thereon during the paring thereof, of a conveyer, a carrier having centering jaws for presenting apples from the conveyer to the supporting device, a slide, a member pivoted to the slide and adapted to move to and from the apples on the conveyer to force them to the jaws of the carrier, and means connected to said pivoted member for swinging it on the slide and for reciprocating the slide.

24. The combination with an apple paring machine having a device for supporting an apple during the paring thereof, of a carrier for presenting apples to said device, movable toward and from the supporting device and having devices for holding and centering an apple thereon, and means for feeding apples to the carrier.

25. The combination with an apple paring machine having a device for supporting the apple during the paring thereof, of a carrier for presenting apples to said device, movable toward and from the supporting device and having relatively yielding jaws for holding and centering an apple thereon, and means for feeding apples between the jaws.

26. The combination with an apple paring machine having a device for supporting an apple during the paring thereof, of a carrier mounted to swing in the arc of a circle to present an apple to the paring machine and having devices for centering an apple thereon, and means for feeding apples to the carrier.

27. The combination with an apple paring machine having a device for supporting an apple during the paring thereof, of a carrier mounted to swing in the arc of a circle to present an apple to the paring machine and having relatively yielding jaws for centering an apple thereon, and means for feeding apples between the jaws.

28. A carrier for feeding apples comprising a support having a recess in one edge thereof, and a pair of spring pressed jaws arranged on opposite sides of the recess and having portions in proximity to the support movable toward and from each other, the opposed faces of said jaws being recessed to provide a pocket closed at one side by the support and open at the opposite side to permit the delivery of the apple, the free ends of said jaws having diverging faces permitting an apple to enter between the jaws in a plane parallel with the supporting face of the support.

29. The combination with an endless conveyer, of a carrier receiving apples from the conveyer, mounted for movement upwardly and over said conveyer and having relatively movable jaws centering the apples received from said conveyer, and an apple paring machine having a device receiving apples singly from the carrier and supporting them during the paring operation.

30. The combination with a movable carrier having relatively movable jaws movable therewith, of an endless conveyer for directing the apples to the jaws, and means for forcing the apples on the conveyer between the jaws of the carrier.

31. The combination with a carrier for presenting apples to a suitable paring or slicing machine, having relatively movable centering members, of a pair of endless conveyers acting conjointly to direct the apples to the carrier, and a feeder working between the conveyers to force the apples between the centering members of the carrier.

32. The combination with a carrier for presenting apples to a suitable paring or slicing machine, having relatively movable centering members, of a pair of endless conveyers acting conjointly to direct the apples to the carrier, and a reciprocatory and oscillatory feeder working between the conveyers to force the apples between the centering members of the carrier.

33. The combination with a carrier for presenting apples to a suitable paring or slicing machine, of a conveyer for directing apples to the carrier, a suitably mounted slide, a feeder pivoted to the slide and adapted to move the apples on the conveyer to the carrier, and devices connected to the feeder for oscillating it and for moving the slide.

34. The combination with a carrier for presenting apples to a suitable paring or slicing machine, of a conveyer for directing apples to the carrier, a suitably mounted slide, a feeder pivoted to the slide and adapted to move the apples on the conveyer to the carrier, devices connected to the feeder for oscillating it and for moving the slide, and a retarding device acting on the slide.

35. The combination with a carrier for presenting apples to a suitable paring or slicing machine, of a conveyer for directing apples to the carrier, a suitably mounted slide, a feeder pivoted to the slide and adapted to move the apples on the conveyer to the carrier, devices connected to the feeder for oscillating it and for moving the slide, and a retarding device acting on the slide and comprising a spring finger having a nose to enter notches in the slide.

36. The combination with a carrier for presenting apples to a suitable paring or slicing machine, of a conveyer for directing apples to the carrier, a suitably mounted slide, a feeder pivoted to the slide and adapted to move the apples on the conveyer to the carrier, a retarding device acting on the slide, a rotary element, and a pitman connecting the rotary element to the feeder.

37. The combination with a carrier having devices for centering an apple thereon, of an arm extending from the carrier, a swinging member coöperating with the arm to move the carrier, a rotary element, a clutch connection between the rotary element and the swinging member, a device controlling the clutch to release the swinging member when the carrier reaches a certain position, and a brake retarding the descent of the swinging member and the carrier.

38. The combination with a carrier having devices for centering an apple thereon, of an arm extending from the carrier, a swinging member coöperating with the arm to move the carrier and movable in the direction of its turning axis, a rotary element turning about an axis coincident with the turning axis of the swinging member and having a projection thereon coöperating with the swinging member, and a device for moving the swinging member out of the path of the projection when the carrier reaches a certain position.

39. The combination with a carrier having devices for centering an apple thereon, of an arm extending from the carrier, a swinging member coöperating with the arm to move the carrier and movable in the direction of its turning axis, a rotary element turning about an axis coincident with the turning axis of the swinging member and having a projection thereon coöperating with the swinging member, and a fixed cam coöperating with the swinging member to move it out of the path of the projection when the carrier reaches a certain position.

40. The combination with a carrier having devices for centering an apple thereon, of an arm extending from the carrier, a swinging member coöperating with the arm to move the carrier, and movable in the direction of its turning axis, a rotary element turning about an axis coincident with the turning axis of the swinging member and having a projection thereon coöperating with the swinging member, a fixed cam coöperating with the swinging member to move it out of the path of the projection when the carrier reaches a certain position, and a brake coöperating with the swinging member to retard the descent of the carrier.

41. The combination with a movable carrier having devices for centering an apple thereon, of an endless conveyer movable to carry apples to the carrier, a movable gate arranged to operate on the apples on the conveyer before they reach the carrier, and means for moving the carrier, connected to the gate to operate the latter.

42. The combination with a movable carrier having devices for centering an apple thereon, of a conveyer directing apples to the carrier, a feeder for moving the apples on the conveyer to the carrier, and a device for retarding the apples on the conveyer before they reach the carrier said device being connected to the feeder to be operated thereby to release the apples.

43. The combination with a movable carrier having devices for centering an apple thereon, of a conveyer directing apples to the carrier, a reciprocatory feeder for moving the apples on the conveyer to the carrier, a gate arranged to retard the apples on the conveyer, and a reciprocatory device connected to the feeder and having a cam portion coöperating with the gate.

44. The combination with a movable carrier having devices for centering an apple thereon, of a movable conveyer for directing apples to the carrier, a movable gate for retarding the apples on the conveyer having a friction surface to hold the apples against turning, and means for moving the gate to release the apples.

45. The combination with a carrier, of a pair of spaced belts for directing apples to the carrier, said belts having diverging ribs thereon, and means for feeding apples singly to the belts.

46. The combination with a carrier, of a conveyer for directing apples to the carrier, and a second carrier arranged to one side of the conveyer and having laterally discharging pockets to deliver the articles to the conveyer.

47. The combination with a carrier, of a conveyer for directing apples to the carrier, and an endless carrier having pockets arranged to discharge to the conveyer, doors for closing the pockets, and a device for opening the doors.

48. The combination with a carrier, of an endless conveyer for directing apples to the carrier, an endless carrier having pockets, sliding doors closing the pockets, springs closing the doors, and a device for opening the doors.

49. The combination with a carrier, of an endless conveyer for directing apples to the carrier, a second carrier having pockets, sliding doors closing the pockets, springs closing the doors, and a device for opening the doors comprising a spring finger having a portion coöperating with the second named carrier to release a door after the discharge of an apple.

50. The combination with a plurality of carriers, of an endless conveyer for directing apples to all of the carriers, and means for feeding the endless conveyer in advance of each of the first named carriers.

51. The combination with a plurality of carriers, of an endless conveyer for directing apples to all of the carriers, a single carrier having pockets, and devices for causing said pockets to discharge their contents on the conveyer in advance of each of the first named carriers.

52. A means for righting apples in fruit handling machines comprising a movable supporting surface for the apples, and means acting on the apples during the movement of the supporting surface to cause the apples to be positioned with their cores upright.

53. A means for righting apples comprising a movable supporting surface for the apples, and a retarding device acting on the apples during such movement, to cause them to come to rest with their cores upright.

54. The combination with an apple paring machine having means for supporting an apple during the paring thereof, of means for causing an apple to assume a position with its core vertically arranged, and a carrier having means for centering the apples thus righted and movable to transfer them to the supporting device of the paring machine.

55. The combination with an apple paring machine having a device for supporting an apple during the paring thereof, of two relatively movable parts arranged to act on the apple to cause it to assume a position with its core upright, and means for centering the righted apple and presenting it to the supporting device of the apple paring machine.

56. The combination with an apple paring machine having a device for supporting an apple during the paring thereof, of an endless carrier, means acting on the apple moving with the endless carrier to cause the apple to assume a position with its core upright, and means for centering the apple and presenting it to the supporting device.

BURTON CRAIG COONS.

Witnesses:
RUSSELL B. GRIFFITH,
HAROLD H. SIMMS.